(12) United States Patent
Sato (10) Patent No.: US 9,778,120 B2
(45) Date of Patent: Oct. 3, 2017

(54) LOAD CELL

(71) Applicant: A&D Company Limited, Tokyo (JP)

(72) Inventor: Isao Sato, Tokyo (JP)

(73) Assignee: A&D COMPANY, LIMITED, Tokyo (JP)

( * ) Notice: Subject to any disclaimer, the term of this patent is extended or adjusted under 35 U.S.C. 154(b) by 136 days.

(21) Appl. No.: 14/438,384

(22) PCT Filed: Nov. 2, 2012

(86) PCT No.: PCT/JP2012/078447
§ 371 (c)(1),
(2) Date: Apr. 24, 2015

(87) PCT Pub. No.: WO2014/068761
PCT Pub. Date: May 8, 2014

(65) Prior Publication Data
US 2015/0285695 A1    Oct. 8, 2015

(51) Int. Cl.
| | | |
|---|---|---|
| G01L 1/00 | (2006.01) | |
| G01L 5/00 | (2006.01) | |
| G01L 1/26 | (2006.01) | |
| G01L 1/22 | (2006.01) | |

(52) U.S. Cl.
CPC .............. *G01L 1/26* (2013.01); *G01L 1/2206* (2013.01); *G01L 1/2243* (2013.01)

(58) Field of Classification Search
CPC ........ G01L 1/26; G01L 1/2206; G01L 1/2243
USPC .................................................. 73/862.382
See application file for complete search history.

(56) References Cited

U.S. PATENT DOCUMENTS

| | | | | | |
|---|---|---|---|---|---|
| 4,419,902 A | * | 12/1983 | Somal | ................... | G01L 1/2243 |
| | | | | | 177/211 |
| 5,440,077 A | * | 8/1995 | Konishi et al. | ......... | G01G 23/10 |
| | | | | | 177/185 |
| 6,472,618 B1 | * | 10/2002 | Izumo et al. | ......... | G01G 21/244 |
| | | | | | 177/210 EM |
| 2003/0097887 A1 | | 5/2003 | Lavar | | |

FOREIGN PATENT DOCUMENTS

| | | | | |
|---|---|---|---|---|
| EP | EP 0227850 A1 | * | 7/1987 | ........... G01L 1/2243 |
| EP | 1070945 A1 | | 1/2001 | |
| JP | 62-047929 U1 | | 3/1987 | |
| JP | 3-057934 A | | 3/1991 | |
| JP | 2506104 U | | 5/1996 | |

(Continued)

*Primary Examiner* — Lisa Caputo
*Assistant Examiner* — Roger Hernandez-Prewitt
(74) *Attorney, Agent, or Firm* — Roberts Mlotkowski Safran Cole & Calderon P.C.

(57) ABSTRACT

A load cell includes a flexure element having a Roberval mechanism in which the respective ends of a pair of top and bottom parallel beams including a thin section are integrated in a fixed portion and in a movable portion, and a stopper for preventing an overload disposed between the pair of the top and bottom parallel beams by being fixed to the fixed portion. The front portion of the stopper is disposed in a concave portion for engaging the stopper formed on the inner side surface of the movable portion and extending in the width direction, and the front portion of the stopper of which a width is larger than the movable portion projects outwardly in the width direction of the movable portion.

6 Claims, 8 Drawing Sheets

(56) References Cited

FOREIGN PATENT DOCUMENTS

| | | | |
|---|---|---|---|
| JP | 2002-365125 | A | 12/2002 |
| JP | 2010-249731 | A | 11/2010 |
| WO | 2012049714 | A1 | 4/2012 |

* cited by examiner

LOAD CELL

TECHNICAL FIELD

The present invention relates to a load cell, and, especially, relates to a Roberval load cell, which includes a built-in stopper for preventing an overload.

BACKGROUND ART

A Roberval load cell is used for, for example, a balance for commerce and industry, and includes a flexure element having four thin parts in all which are composed of a top pair and a bottom pair each having two thin parts. The base part of the flexure element is fixed in a cantilever manner, and the top part is applied with a load. Two thin parts out of the four parts act as tension sides and another two parts act as compression sides. Strain gauges are bonded to each of the thin parts of the tension sides and of the compression sides. The four strain gages are connected with one another to constitute the Wheatstone bridge.

In the load cell having such configuration, a stopper for preventing the overload is mounted for preventing the excessive deformation of the thin parts during the application of the overload to the load cell (flexure element).

Ordinarily, the stopper is mounted in the vicinity of the load cell separated from the load cell itself, and, for example, a screw-type separate stopper is mounted between a support frame by which the load cell is vertically fixed and a bottom plate of a housing in a commercial desktop balance (for example, refer to Patent Publication 1).

This separate stopper is required to be mounted depending on a kind of a load. For example, one or two stoppers are mounted on the front end of the load cell in case of a vertical lower load (that is, a load when a subject to be measured is dropped on or near the center of a weighing dish). Four stoppers are mounted on every four corners of the load cell in case of a torsional and vertical lower load (a load when a subject to be measured is dropped on or near the four corners of a weighing dish). The former stopper is referred to as a center stopper while the latter is referred to as a four-corner stopper.

Further, a stopper for an upper load is required in addition to the lower load, and the stopper for a vertical upper load and a torsional and vertical upper load is required. The vertical upper load herein is an overload which, for example, when a vertical overload is applied (or a subject to be weighed is dropped on a balance) and the stopper receives a downward load, is generated by bouncing the load cell in an upward direction by means of a shocking reactive force of a load and reversely transmitted in an upward direction. In another case, the vertical upper load is generated when a weighing apparatus is conveyed by grasping a weighing dish.

On the other hand, the torsional and vertical upper load is an overload which, when a subject to be weighed is dropped on the vicinity of one of the four corners of the weighing dish so that the torsional load is applied on the load cell followed by the generation of a downward load on the side the subject is dropped, is transmitted by twisting the other side of the dish reversely in an upward direction. Also in case of these upper loads, stoppers are required. In case of separate stoppers, the stopper is required for each type of the stoppers so that a problem arises that the number of the stoppers increases.

The separate stopper includes problems of lower development efficiencies, lower assembling efficiencies and lower processing efficiencies of the load cells. Specifically, the separate stopper is arranged keeping a specified clearance with respect to the flexure element of the load cell. Since this clearance is determined by joining a warp of the load cell during the loading and a warp of a supporting member of the load cell such as a supporting frame and a housing bottom plate, this clearance can be determined only after the shape of the balance is determined and an experiment is conducted. Accordingly, there arises a defect that a long period of development is required and a development efficiency is low.

Additional time is required for the assembling of the load cell because the assembling is conducted while the clearance is determined by using a clearance gauge. The separate stopper includes a defect of not completely preventing of the overload delivered to the load cell because of the deformation of the supporting member for the load cell during the overload.

A stopper-integrated load cell having a built-in stopper is proposed for overcoming these defects.

For example, in Patent Publication 2, horizontally coaxial circular apertures are formed in a fixed portion and a movable portion of a flexure element, and a circular cylindrical stopper fitted and fixed to the circular aperture of the fixed portion is inserted into and disposed in the circular aperture of the movable portion. In this load cell, the deformation of the flexure element due to the overload can be prevented by the contact of the inner circumferential surface of the circular aperture of the movable portion with the outer circumferential surface of the stopper when the overload is applied from side to side and up and down. The simple structure including only the circular cylindrical stopper enables the simple processing and assembling of the load cell.

FIGS. 6 and 7 of Patent Publication 3 depict a stopper horizontally extending and having a square section and a load cell having a penetration aperture. The load cell of Patent Publication 3 also enables the simple processing and assembling of the load cell.

PRIOR ART PUBLICATIONS

Patent Publications

Patent Publication 1: JU-B-2506104
Patent Publication 2: JP-A-2010-249731
Patent Publication 3: JU-A-62-47929 (FIGS. 6 and 7)

SUMMARY OF INVENTION

Problems to be Solved by Invention

However, the stopper-integrated load cells described in Patent Publications 2 and 3 include, at first, a problem of inability of sufficiently suppressing an overload of a torsion direction. That is, when the overload is applied in the torsion direction in Patent Publications 2 and 3, a region where the flexure element is in contact with the stopper is not an end (hereinafter also referred to as edge section) of a width direction of the load cell (flexure element) which includes a large displacement but is restricted to a vicinity of a center section in the width direction of the flexure element which includes a small displacement so that the stopper does not sufficiently function with respect to the overload of the torsion direction.

Secondly, the adjustment of a clearance is burdensome. The measurement of the clearance itself is burdensome and the assembling efficiency of a load cell is bad because the stopper is fixed to a fixed portion, the clearance is measured by a clearance gauge and the stopper is disposed at the center of the width direction of the flexure element.

The present invention has been made in view of these circumstances, and its object is to provide a load cell in which the deformation due to the overload of the torsion direction can be prevented without fail and the development efficiency and the assembling efficiency can be elevated.

Means of Solving Problems

The present invention for achieving the above object has the configuration of a load cell including a flexure element having a Roberval mechanism in which respective ends of a pair of top and bottom parallel beams including a thin section are integrated in a fixed portion and in a movable portion, a stopper for preventing an overload disposed between the pair of the top and bottom parallel beams by being fixed to the fixed portion; and a concave portion for engaging with the stopper extending in a width direction of the flexure element (the movable portion), which is mounted on an inner side surface of the movable portion (facing to the fixed portion), wherein a base portion of the stopper is fixed to the fixed portion, and a front portion of the stopper is disposed in the concave portion keeping a specified clearance; and the front portion of the stopper is formed broader than the movable portion of the flexure element so that the front portion projects toward outside of the width direction of the movable portion.

In accordance with the present invention, the front portion of the stopper having a width larger than that of the movable portion projects toward outside of the width direction of the movable portion. Accordingly, since the front portions of the stopper are planarly disposed along the positions opposing to the edge portion of the concave portion of (the movable portion of) the flexural element, the edge portion of (the movable portion of) the flexural element is in contact with the stopper without fail when the overload in the torsion direction is exerted on (the movable portion of) the flexural element, thereby preventing the delivering of the overload to the flexural element. That is, the above first problem can be resolved.

In accordance with the present invention, since the front portions of the stopper project toward the both outer sides of the movable portion, the load cell can be assembled while the clearance is adjusted by utilizing the projecting portions. That is, the above second problem can be resolved.

Further, in accordance with the present invention, since the present invention includes the flexural element integrating the built-in stopper for preventing the overload, the clearance can be determined only by the shape of the flexural element so that the development efficiency for the load cell can be elevated.

The invention is configured in that the base portion of the stopper includes a broader side plate portion in surface-contact with a side surface of the fixed portion in the width direction, and the side plate portion is fixed to the outer side surface of the fixed portion.

In accordance with this invention, the fixation of the stopper is strong to the extent that the contact area between the broader side plate portion mounted on the base portion of the stopper and the outer side surface of the fixed portion is large.

The assembling of the load cell can be effectively performed because the side plate portion can be fixed by means of the screw from the outside of the flexural element in the width direction when the side plate portion is fixed to the fixed portion.

The invention is configured in that the side plate portions are mounted on both sides of the front portion of the stopper in the width direction, and the pair of the side plate portions are fixed to right and left outer side surfaces of the fixed portion.

In accordance with this invention, the fixation of the stopper is much stronger because the two side plate portions sandwich the fixed portion.

The invention is further configured in that the base portion of the stopper includes an end plate portion in surface-contact with the base portion of the fixed portion, and the end plate portion is fixed to the base portion of the fixed portion.

When the end plate portion mounted on the base portion of the stopper is fastened and fixed on the base surface of the fixed portion by means of the screw, the tightening torque is not exerted in the direction of changing the clearance at the front portion of the stopper. Accordingly, the stopper can be easily mounted on the correct position.

The invention is further configured in that the stopper is divided into two in the width direction of the flexure element, and each of the two separate stoppers is fixed to the fixed portion of the flexure element.

In accordance with the invention, since each of the two separate stoppers can be fixed by the screw from the outside of the flexural element in the width direction, the assembling of the load cell can be effectively performed The invention is also configured in that the stopper includes a constant height in a vertical direction and is angular C-shaped (nearly U-shaped) in its horizontal section, and a pair of angular C-shaped crossbars (linear bars) are fixed to right and left outer side surfaces of the fixed portion of the flexural element.

In accordance with the invention, the stopper can be easily manufactured, after the metal material is extrusion-molded to the angular C-shaped section, by cutting the metal material by a specified width or by bending the rectangular metal plate in a front view at two positions for orthogonal crossing. That is, the stopper can be manufactured at a lower cost.

Effects of Invention

In accordance with the load cell of the present invention, the excessive deformation of the thin portions due to the overload in the torsion direction exerted on the flexural element can be prevented without fail for a longer period of time because the front portion of the stopper for preventing the overload projects toward the outside in the direction of the movable portion, further the assembling of the load cell can be easily conducted by utilizing the outward projecting part of the movable portion of the front portion of the stopper, and still further, the development efficiency of the load cell can be elevated because the clearance can be determined only by the shape of the load cell.

EMBODIMENTS FOR IMPLEMENTING INVENTION

Figure 1:
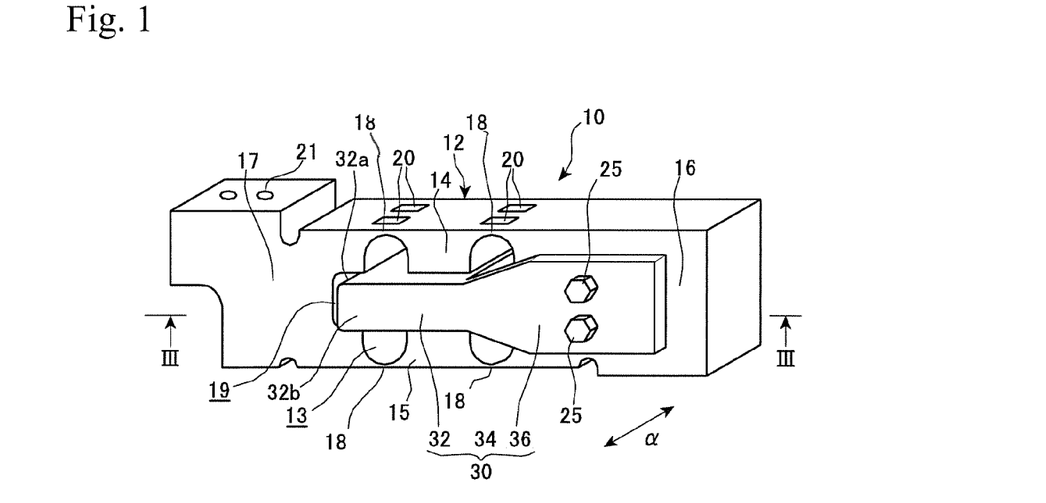
FIG. 1 A perspective view showing a load cell of a first embodiment.
Figure 2:
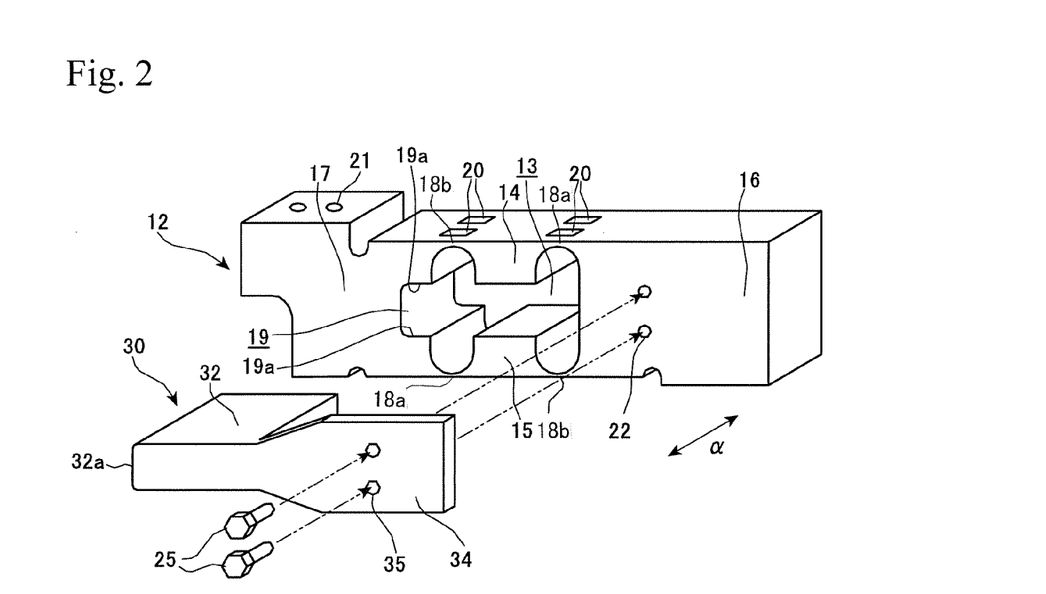
FIG. 2 An exploded perspective view of the load cell of FIG. 1.
Figure 3:
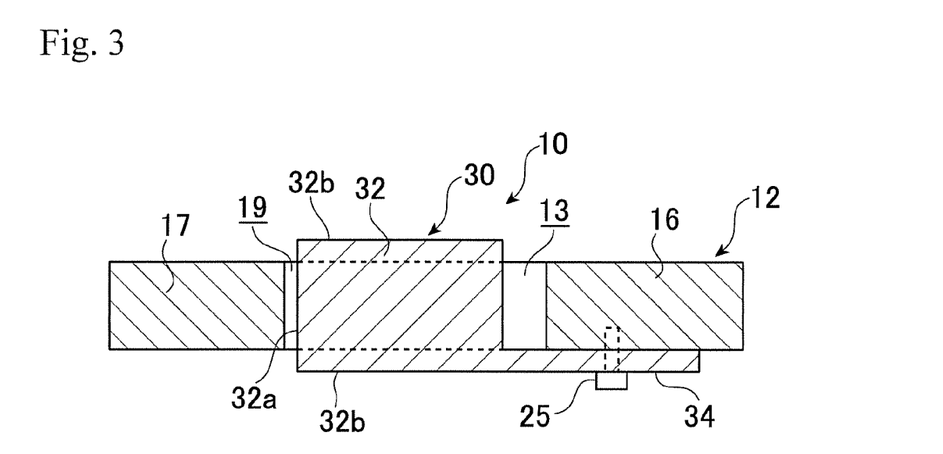
FIG. 3 A sectional view of the load cell taken along a line III-III of FIG. 1.

Preferable embodiments of the present invention for the load cell will be described referring to the annexed drawings. FIG. 1 is a perspective view showing a load cell 10 of a first embodiment to which the present invention is applied, FIG. 2 is an exploded perspective view of the load cell 10, and FIG. 3 is a sectional view taken along a line III-III of FIG. 1.

As shown in these drawings, the load cell 10 mainly includes a flexural element 12, strain gauges 20 and a stopper 30 for preventing an overload.

The flexure elements 12 is composed of a metal such as aluminum, and is produced, for example, by cutting, with a constant width, the metal having a specified shape prepared by extrusion molding, if necessary, followed by a cutting operation. A penetration aperture 13 in the shape of nearly eyeglasses is formed through the flexural element 12 in the width direction (direction of arrow α). The formation of this penetration aperture 13 provides the flexure element 12 with a Roberval mechanism including a top beam 14 and a bottom beam 15 disposed in parallel, a fixed portion 16 and a movable portion 17 each connecting the both ends of the pair of the top beam 14 and the bottom bean 15, and two thin sections 18 positioned on the top beam 14 and the bottom beam 15 and opposing to each other. A total of the four thin sections 18 are formed, and two thin sections 18 are pulled and the remaining two thin sections 18 are compressed when a load is applied to the movable portion 17 for deforming the flexural element 12.

In the drawings, the thin sections 18 of the pulling side are designated by "18a" and the thin sections 18 of the compressing side are designated by "18b". In the present embodiment, two strain gauges 20 are attached on the thin sections 18a of the pulling side (right-hand side of the drawings) of the top beam 14, and two strain gauges 20 are attached on the thin sections 18b of the compressing side (left-hand side of the drawings) of the top beam 14. The positions and the number of the strain gauges 20 are not restricted thereto, and, for example, one strain gauge 20 can be attached to each of the four thin sections 18. The strain gauges 20 arranged in this way and electrically connected constitute a bridge circuit.

On the other hand, the fixed portion 16 is fixed to a main body of an apparatus (not shown) such as a case, and in the present embodiment, screw apertures (not shown) are formed on the bottom surface of the fixed portion 16 which is fixed to the main body of the apparatus by the threadable mounting on the bottom surface. The movable portion 17 is formed at the other side of the fixed portion 16 in the flexural element 12. A weighing dish (not shown) is connected to the movable portion 17 and, in the present embodiment, screw apertures 21 are formed on the top surface of the movable portion 17. A supporting member of the weighing dish (not shown) is fixed by means of threadable mounting from the upper side. A concave portion 19 for engaging with the stopper extending in a width direction of the flexure element 12 is formed on an inner side surface (a side surface facing to the penetration aperture 13) of the movable portion 17. The concave portion 19 includes the constant shape along the width direction of the flexural element 12, and part of the front portion 32 of the stopper 30 is placed in the concave portion 19.

The stopper 30 includes the front portion 32 placed in the concave portion 19 and a base portion 34 fixed to the side surface of the fixed portion of the flexural element 12, and are integrally formed by using the same material (for example, aluminum) with that of the flexural element 12. While the material of the stopper 30 is preferably the same as that of the flexural element 12, an alloy containing different addition components (for example, an aluminum alloy containing components different from those of the flexural element) may be employed. A material having a similar spring action as the material of the flexural element 12 may be employed.

The stopper front portion 32 is formed as a shape (for example, a plate shape having specified thickness) disposable inside of the penetration aperture 13 and in non-contact therewith. The front portion 32 is formed broader than the flexure element 12 so that the front portion projects toward outside of the width direction of the movable portion when the stopper is fixed to the flexure element 12 as shown by a symbol 32b in FIG. 3. The front part 32a of the stopper front portion 32 is disposed in the concave portion 19 of the movable portion 17 in the no-contact manner. The front portion 32 having the parallel and flattop and bottom surfaces creates a clearance between the top and bottom surfaces of the concave portion 19 when placed in the concave portion 19.

The stopper base portion 34 includes a plate-shaped side plate portion 36 with a broader width which is in surface-contact with the outer side surface of the fixed portion 16 of the flexure element 12, and is connected to the one end of the stopper front portion 32 in the width direction. Accordingly, as shown in FIG. 3, the stopper 30 includes an L-shaped horizontal section as a whole. As shown in FIG. 2, the side plate portion 36 has larger width (vertical dimension) along the vertical direction than the thickness of the front portion 32 and includes two insertion apertures 35 for screws 25 in the two upper and lower positions. Screw apertures 22 are provided in the outer side surface of the fixed portion 16 in conformity with the insertion apertures 35.

The front portion 32 of the stopper 30 having such configuration is inserted into the penetration aperture 13 of the flexure element 12 and the front part 32a of the front portion 32 is placed in the concave portion 19 of the movable portion 17 so that the side plate portion 36 is in surface-contact with the outer side surface of the fixed portion 16. At this stage, the front portion 32 of the stopper 30 projects toward the both sides of the movable portion 17 of the flexure element 12 because the front portion 32 of the stopper 30 is formed broader than the flexure element 12. Then, after a jig for position determination (not shown) is touched to the projecting portion 32b (refer to FIG. 3) for adjusting the clearances between the front portion 32 and the top and bottom surfaces of the concave portion 19, the screws 25 are inserted into the insertion apertures 35 and fastened to the screw apertures 22 while the situation is maintained. Thereby, the stopper 30 is fixed while its position is determined with respect to (the concave portion 19 of) the flexure element 12.

Then, the performance of the load cell 10 having the above configuration will be described.

As shown by the symbol 32b of FIG. 3, the front portion 32 of the stopper 30 projects toward the both sides of the movable portion 17 in the load cell 10 because the front portion 32 of the stopper 30 is formed broader than the movable portion 17 of the flexure element 12. When an overload of the vertical direction is exerted on the movable portion 17 of the load cell 10, the bottom surface or the top surface of the concave portion 19 of the movable portion 17 is in contact with the top surface or the bottom surface of the front portion 32 of the stopper 30 so that the transmission of the overload to the flexure element 12 is prevented for suppressing the excessive deformation of the thin portions 18.

When an overload in a torsion direction is exerted on the movable portion 17 of the load cell 10, an end portion (edge portion) 19a in the extending direction of the concave portion 19 which is an end in the width direction of the flexure element 12 deforms in a maximum level, and the maximum load is delivered to a position where the edge portion 19a is in contact with the stopper front portion 32. At a position where the top and bottom of the edge portions 19a oppose to each other, the front portion 32 of the stopper has a certain surface area. That is, at a position where the top and bottom of the edge portions 19a oppose to each other, a planar region of the front portion 32 of the stopper extends. Accordingly, when the overload in the torsion direction is exerted on the flexure element 12, the edge portion 19a is in contact with (the planar region of) the front portion 32 of the stopper 30 without fail so that the excessive overload more than a specified value is not delivered to the flexure element 12, and the excessive deformation of the thin portions 18 can be suppressed.

In this manner, the load cell of the present embodiment is effective for suppressing the excessive deformation of the thin portions not only with respect to the overload in the vertical direction but also to the overload in the torsion direction.

Since the built-in stopper 30 is integrated in the flexure element 12 in the present embodiment, the clearance between stopper 30 and the flexure element 12 can be determined only by the shape of the flexure element 12 so that the development efficiency of the load cell can be elevated.

Since the front portion 32 of the stopper 30 projects from the movable portion 17 of flexure element 12 toward the both sides in the width direction in the present embodiment, the stopper 30 can be easily fixed to a precise position by utilizing the projecting portions 32b, and the assembling efficiency of the load cell can be elevated. In addition, in the present embodiment, the stopper 30 is fixed to the flexure element 12 by the threadable mounting from the outside so that the assembling efficiency of the load cell can be further elevated.

Figure 4:
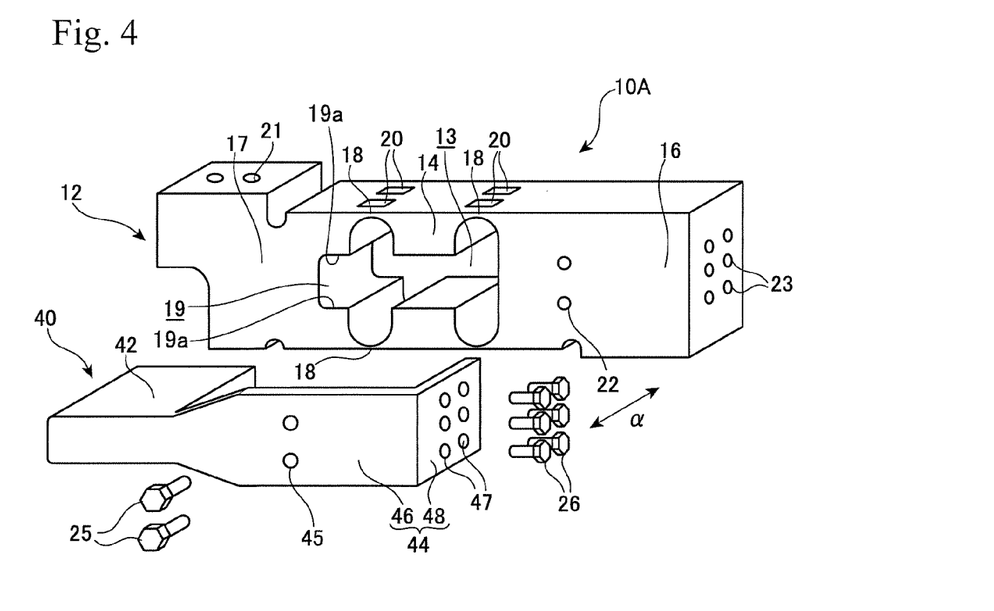
FIG. 4 An exploded perspective view of a load cell of a second embodiment.
Figure 5:
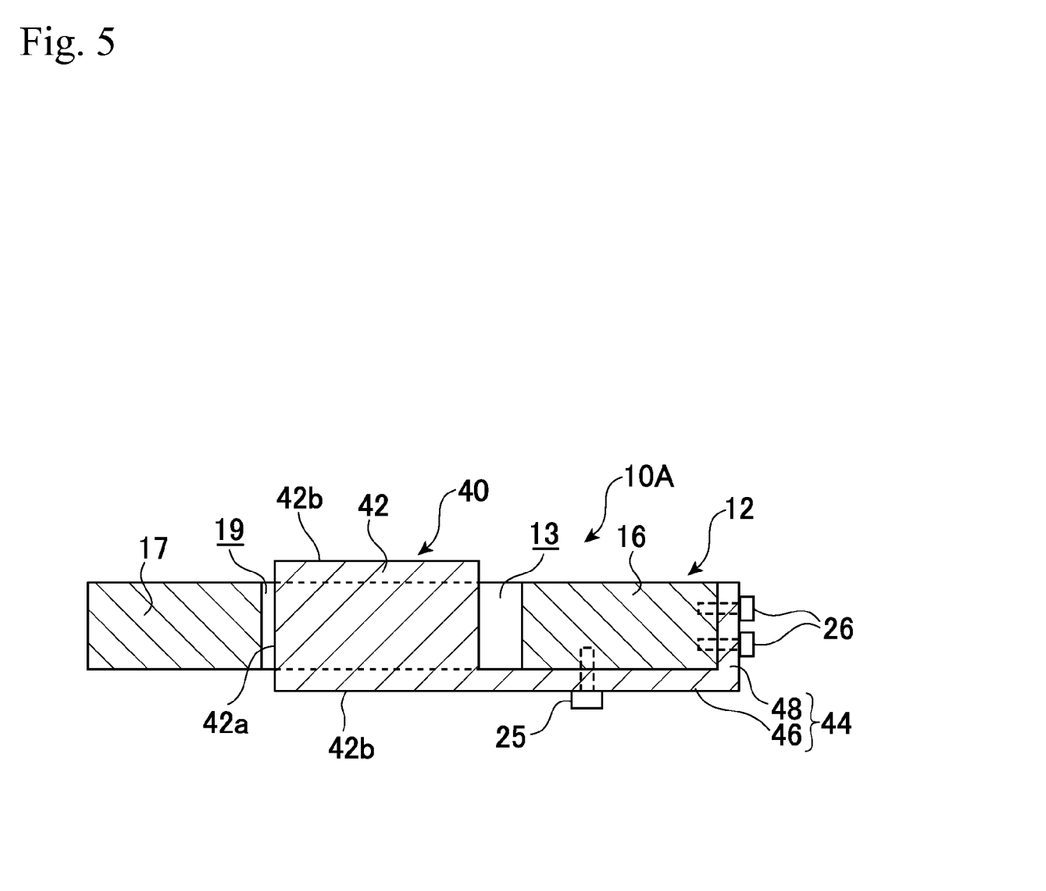
FIG. 5 A horizontal sectional view of the load cell of FIG. 4.

FIG. 4 is an exploded perspective view of a load cell 10A of a second embodiment, and FIG. 5 is a horizontal sectional view of the load cell 10A near the center thereof (the section at the same position as that of FIG. 3).

In the load cell 10A of the second embodiment, only the shape of a stopper 40 is different from the load cell 10 of the first embodiment, and the other components are same as those of the load cell 10. Accordingly, the stopper 40 having the different configuration will be described in detail, and the description of the components having similar configurations and performances to those of the load cell 10 will be omitted by attaching the same symbols thereto.

The stopper 40 of the second embodiment differs from the stopper 30 of the first embodiment in that an end plate portion 48 is formed.

The stopper 40 is composed of a front portion 42 and a base portion 44 integrated with each other, and the front portion 42 is formed broader than the movable portion 17 of the flexural element 12 similarly to the first embodiment.

The base portion 44 is composed of a side plate portion 46 and the end plate portion 48. The side plate portion 46 is, similarly to the side plate portion 36 of the first embodiment, a plate-shaped element in surface-contact with an outer side surface of the fixed portion 16 of the flexural element 12 and is connected to one end of the front portion 32 in the width direction, and insertion apertures 45 for screws 25 are formed through the side plate portion 46.

On the other hand, the end plate portion 48 is a plate-shaped element in surface-contact with an end surface (the base surface of the fixed portion 16) in the longitudinal direction of the flexural element 12, and extends in a direction perpendicular to the side plate portion 46. Accordingly, the stopper 40 of the second embodiment is angular C-shaped (nearly U-shaped) in its horizontal section, as a whole. A plurality of insertion apertures 47 through which screws 26 are perforated through the end plate portion 48, and screw apertures 23 are formed through the fixed portion 16 of the flexure element 12 at positions corresponding to the above insertion apertures 47. While the number and the arrangement of the insertion apertures 47 and the screw apertures 23 are not restricted thereto, for example, six apertures including three vertical columns and two horizontal rows are arranged. The screws 26 used for temporary joint are smaller than the screws 25.

While the screws 25 and the screws 26 are concurrently used and the screws 26 are used for the temporary joint in the present embodiment, the screws are not restricted thereto. The screws 25 and the screws 26 of the same size may be used, and only the screws 25 or the screws 26 may be used.

In the second embodiment having the above configuration, at first, the front portion 42 of the stopper 40 is inserted into the penetration aperture 13 of the flexural element 12, and a front part 42a of the front portion 42 is placed in the concave portion 19 of the movable portion 17. Then, while the side plate portion 46 is in surface-contact with the outer side surface of the fixed portion 16, the end plate portion 48 of the stopper 40 is in surface-contact with the base surface of the fixed portion 16. Since the front portion 42 of the stopper 40 is broader than the flexural element 12 at this stage, the front portion 42 of the stopper 40 projects toward the both sides of the movable portion 17 of the flexural element 12 as shown by a symbol 42b of FIG. 5.

Then, after a jig for position determination (not shown) is touched to the projecting portion 42b for adjusting the clearances between the top and bottom surfaces of the concave portion 19 and the front portion 42, the screws 26 inserted into the insertion apertures 47 of the end plate portion 48 are fastened into the screw apertures 23 of the fixed portion 16 to temporarily mount the stopper 40, while the above situation is maintained. At this stage, since the tightening torque of the screws 26 does not act toward the direction of changing the clearances, the stopper 40 can be temporarily mounted with the precise clearances.

Then, the screws 25 are inserted into the insertion apertures 45 of the side plate portion 46, and are fastened into the screw apertures 22 of the fixed portion 16 for fixing the stopper 40. Thereby, the stopper 40 is fixed to the fixed portion 16 such that two perpendicular surfaces are in surface-contact with each other for realizing a stronger fixation.

Figure 6:
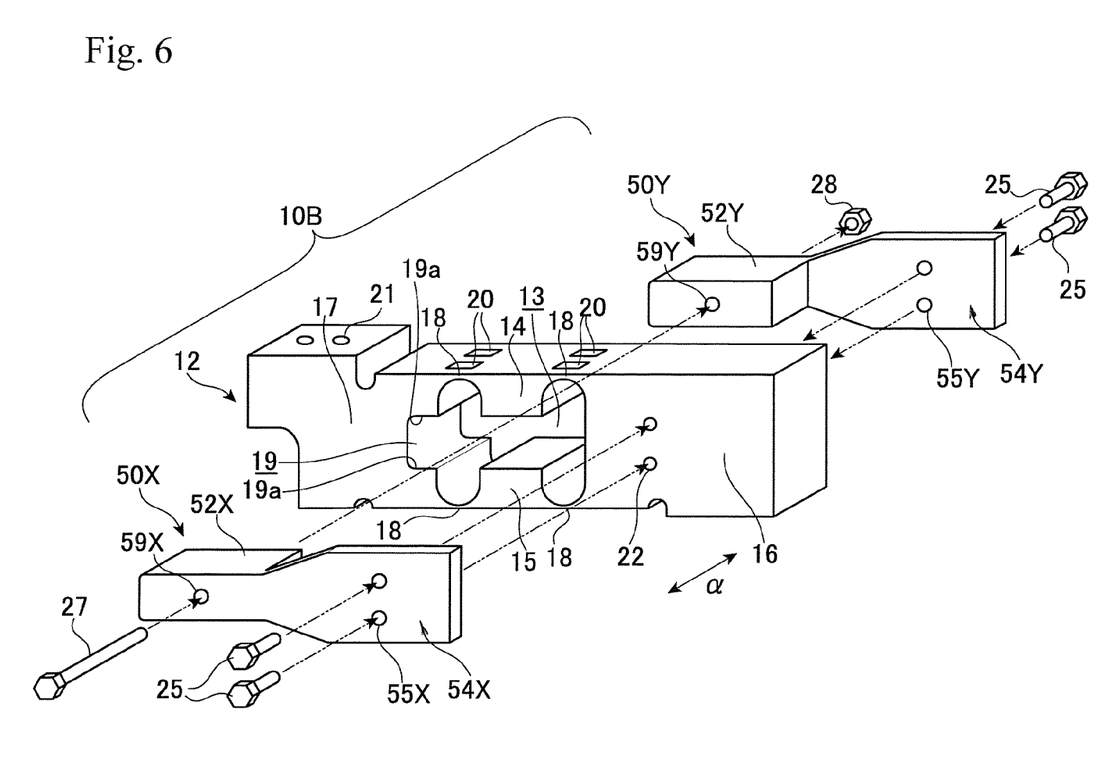
FIG. 6 An exploded perspective view of a load cell of a third embodiment.
Figure 7:
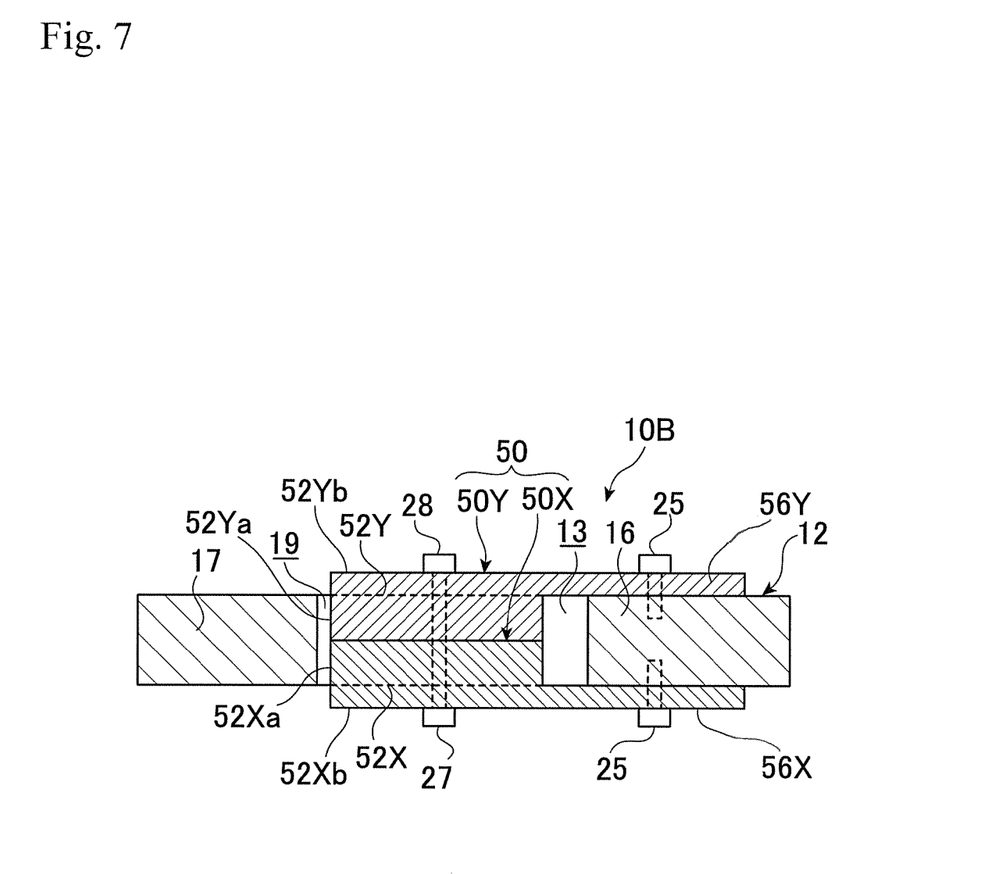
FIG. 7 A horizontal sectional view of the load cell of FIG. 6.

FIG. 6 is an exploded perspective view of a load cell 10B of a third embodiment, and FIG. 7 is a horizontal sectional view of the load cell 10B near the center thereof (the section at the same position as that of FIG. 3). The description of the components having similar configurations and performances to those of the load cells 10, 10A of the above first and second embodiments will be omitted by attaching the same symbols thereto.

A stopper 50 of the third embodiment largely differs from the stopper 30 of the first embodiment in that it is divided into two in the width direction. That is, the stopper 50 of the third embodiment includes two parts separated in the width direction (hereinafter referred to as separate stoppers 50X, 50Y).

The separate stopper 50X is composed of a front portion 52X and a base portion 54 integrated with each other, and the front portion 52X is formed which can be inserted through the penetration aperture 13 of the flexural element 12. The width of the separate stopper 50X is larger than half of the width of the movable portion 17. An insertion aperture 59X through which a bolt 27 described later is inserted is formed through the front portion 52X. A base portion 54X of the separate stopper 50X includes a side plate portion 56X in surface-contact with the outer side surface of the fixed portion 16, and insertion apertures 55 for the screws 25 are formed through the side plate portion 56X. The side plate portion 56X is connected to the one end of the stopper front portion 52X in the width direction, and the separate stopper 50X includes an L-shaped horizontal section as a whole as shown in FIG. 7.

On the other hand, the separate stopper 50Y is formed surface-symmetrically with the separate stopper 50X, and includes a front portion 52Y and a base portion 54Y integrally formed. The front portion 52Y is formed insertable through the penetration aperture 13 of the flexure element 12, and its width is larger than half the width of the movable portion 17. An insertion aperture 59Y through which the bolt 27 mentioned later is inserted is formed through the front portion 52Y. The base portion 54Y includes a side plate portion 56Y which is in surface-contact with the side surface of the fixed portion 16 reverse to the side surface in surface-contact with the above-mentioned side plate portion 56X. Insertion aperture 55Y for screws 25 are formed through the side plate portion 56Y.

Each of the separate stoppers 50X, 50Y having the above configurations is, at first, fixed to the flexural element 12. That is, the front portions 52X, 52Y are inserted into the penetration aperture 13 of the flexural element 12, the front parts 52Xa, 52Ya of the front portions 52X, 52Y are placed in the concave portion 19 of the movable portion 17, and further the side plate portions 56X, 56Y are in surface-contact with the outer side surface of the fixed portion 16.

Then, after a jig for position determination (not shown) is touched to the projecting portion 52Xb, 52Yb from the movable portion 17 at the front portions 52X, 52Y for adjusting the clearances, the screws 25 are inserted into the insertion apertures 55X, 55Y of the side plate portions 56X, 56Y and fastened to the screw apertures 22 of the fixed portion 16 while the situation is maintained. Then, the separate stoppers 50X, 50Y are connected to each other by inserting the bolt 27 into the insertion apertures 50X, 59Y of the front portions 52X, 52Y and are fastened to a nut 28. The connection between the separate stoppers 50X, 50Y may be performed before the fixation of the separate stoppers 50X, 50Y, or the separate stoppers 50X, 50Y may be actually fixed to the fixed portion 16 after the separate stoppers 50X, 50Y are temporarily mounted on the fixed portion 16 and are connected with each other.

In the stopper 50 of the third embodiment having the above configuration, the entire width of the front portions 52X, 52Y integrally connected is larger than the width of the movable portion 17. Accordingly, similarly to the preceding embodiments, the loading of an overload in the torsion direction can be prevented without fail.

The stronger fixation can be obtained in the stopper 50 of the third embodiment because the separate stoppers 50X, 50Y are fixed such that they sandwich the fixed portion 16 from the both sides in its width direction.

Figure 8:
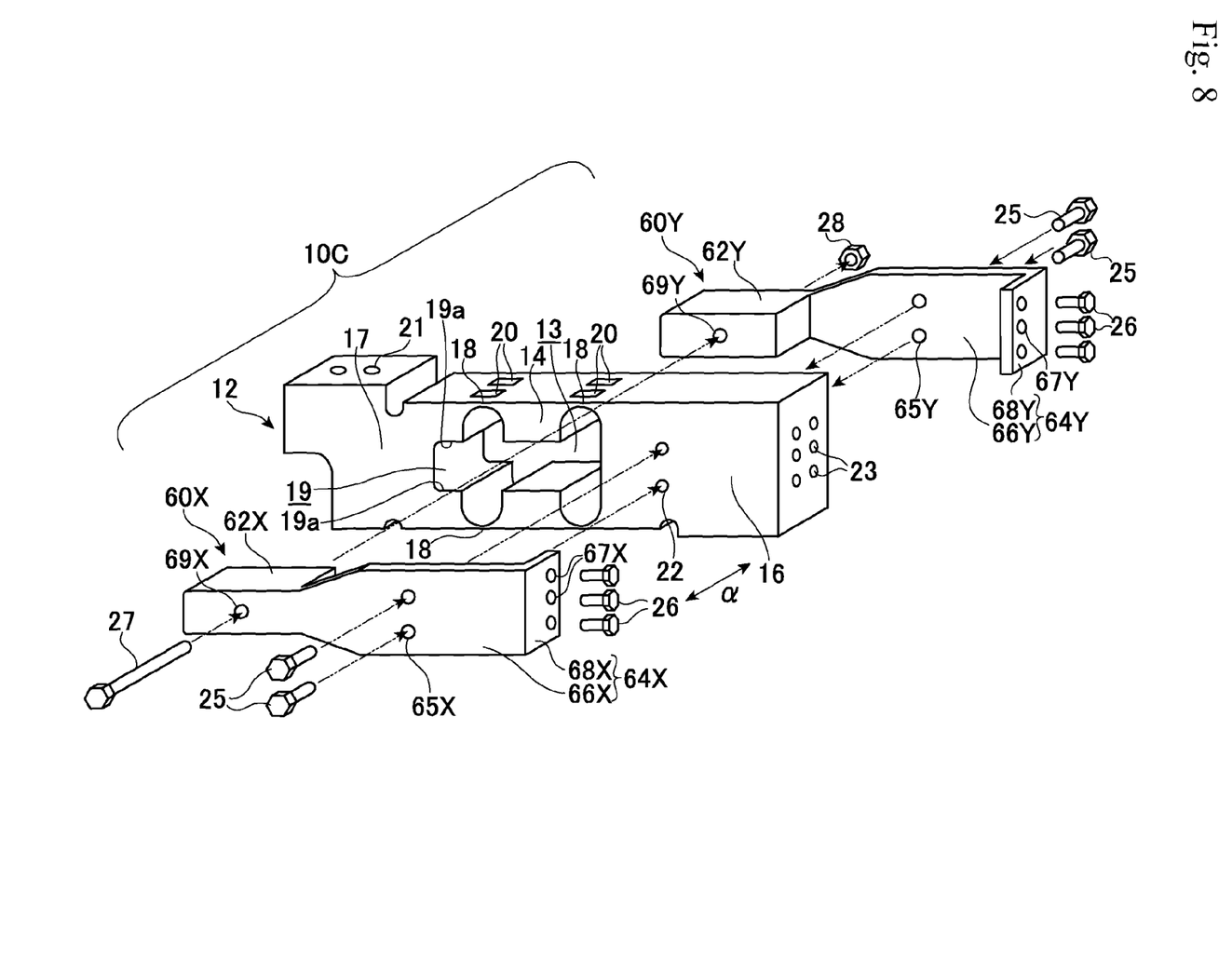
FIG. 8 An exploded perspective view of a load cell of a fourth embodiment.
Figure 9:
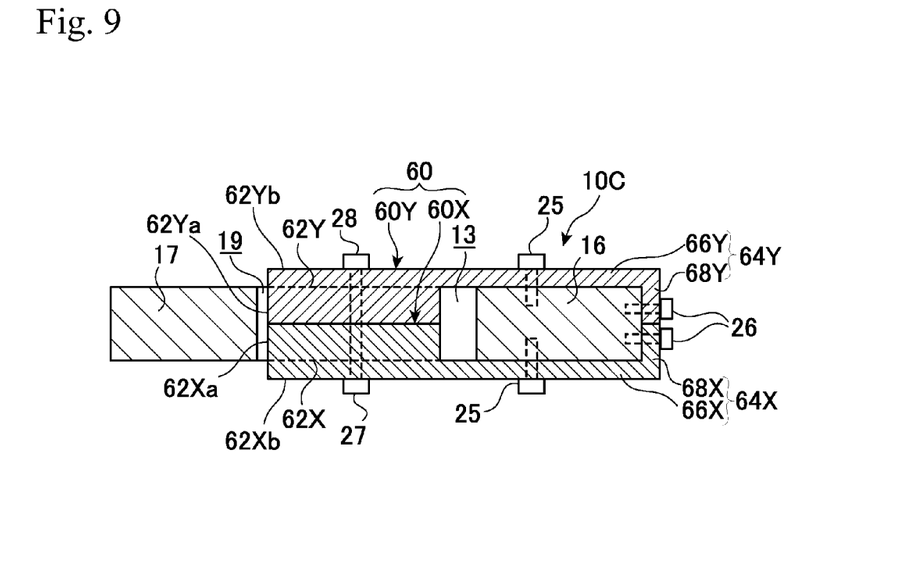
FIG. 9 A horizontal sectional view of the load cell of FIG. 8.

FIG. 8 shows an exploded perspective view of a load cell 10C of a fourth embodiment, and FIG. 9 shows a horizontal sectional view of the load cell 10C near the center thereof (the section at the same position as that of FIG. 3). The description of the components having similar configurations and performances to those of the preceding embodiments will be omitted by attaching the same symbols thereto.

A stopper 60 of the fourth embodiment is different from the stopper 50 of the third embodiment in that end plate portions 68X, 68T are mounted.

The stopper 60 of the fourth embodiment is composed of the separate stoppers 60X, 60Y divided in the width direction. The separate stopper 60X is composed of a front portion 62X and a base portion 64X integrally formed, the front portion 62X is formed insertable into the penetration aperture 13 of the flexural element 12, and its width is larger than half the width of the movable portion 17. An insertion aperture 69X through which the bolt 27 mentioned later is inserted is formed through the front portion 62X. The base portion 64X of the separate stopper 60X includes a side plate portion 66X in surface-contact with the outer side surface of the fixed portion 16 and an end plate portion 68X extending perpendicular to the side plate portion 66X and in surface-contact with the base portion of the fixed portion 16. An insertion aperture 65X for the screw 25 is formed through the side plate portion 66X, and an insertion aperture 67X for the screw 26 is formed through the side plate portion 68X.

On the other hand, the stopper 60Y is formed surface-symmetrically with the separate stopper 60X, and includes a front portion 62Y and a base portion 64Y integrally formed. The front portion 62Y is formed insertable through the penetration aperture 13 of the flexure element 12, and its width is larger than half the width of the movable portion 17. An insertion aperture 69Y through which the bolt 27 mentioned later is inserted is formed through a front portion 62Y. The base portion 64Y includes a side plate portion 66Y and an end plate portion 68Y, an insertion aperture 65Y for the screw 25 is formed through the side plate portion 66Y, and an insertion aperture 67X for the screw 26 is formed through the side plate portion 68Y.

Each of the separate stoppers 60X, 60Y having the above configurations is, at first, fixed to the flexural element 12. That is, the front portions 62X, 62Y are inserted into the penetration aperture 13 of the flexural element 12, the front parts 62Xa, 62Ya of the front portions 62X, 62Y are placed in the concave portion 19 of the movable portion 17, and further the side plate portions 66X, 66Y are in surface-contact with the outer side surface of the fixed portion 16, and the end plate portions 68X, 68Y are in surface-contact with the base surface of the fixed portion 16. Then, after a jig for position determination (not shown) is touched to the projecting portion 62Xb, 62Yb from the movable portion 17 at the front portions 52X, 52Y for adjusting the clearances, the screws 26 are inserted into the insertion apertures 67X, 67Y of the end plate portions 68X, 68Y and fastened to the screw apertures 22 of the fixed portion while the situation is maintained, thereby temporarily mounting the separate stoppers 60X, 60Y to the fixed portion 16. At this stage, the separate stoppers 60X, 60Y can be fixed to (the concave portion 19 of) the flexural element 12 at the correct position because the tightening torque of the screws 26 does not act toward the direction of changing the clearances.

Then, the separate stoppers 60X, 60Y are connected and integrated with each other by inserting the bolt 27 into the insertion apertures 69X, 69Y of the front portions 62X, 62Y and are fastened to the nut 28. Then, the screws 25 are inserted into the insertion apertures 65X, 65Y of the side plate portions 66X, 66Y, and are fastened into the screw apertures 22 of the fixed portion 16.

The entire width of the connected front portions 62X, 62Y in the stopper 60 of the fourth embodiment having the above configuration is larger than the width of the movable portion 17. Accordingly, similarly to the preceding embodiments, the excessive deformation of the thin sections can be effectively suppressed against the overload in the torsion direction exerting on the movable portion 17.

The fixation of the stopper 60 of the fourth embodiment is stronger because the stopper 60 is fixed in the three directions including the rectangular direction with respect to the fixed portion 16.

While the separate stoppers 50X, 60X and the separate stoppers 50Y, 60Y in the third and the fourth embodiments are surface-symmetrical, these are not restricted thereto, and any shape can be employed in which the combined width of the front portions 52X, 62 and the front portions 52Y, 62Y are larger than the movable portion 17 such that the movable portion 17 projects toward the outside. For example, the width of the front portion 52X and the width of the front portion 52Y may be different from each other.

While the separate stoppers 50X, 60X and the separate stoppers 50Y, 60Y in the third and the fourth embodiments are connected with each other, these are not restricted thereto, and can be used without the connection.

Figure 10:
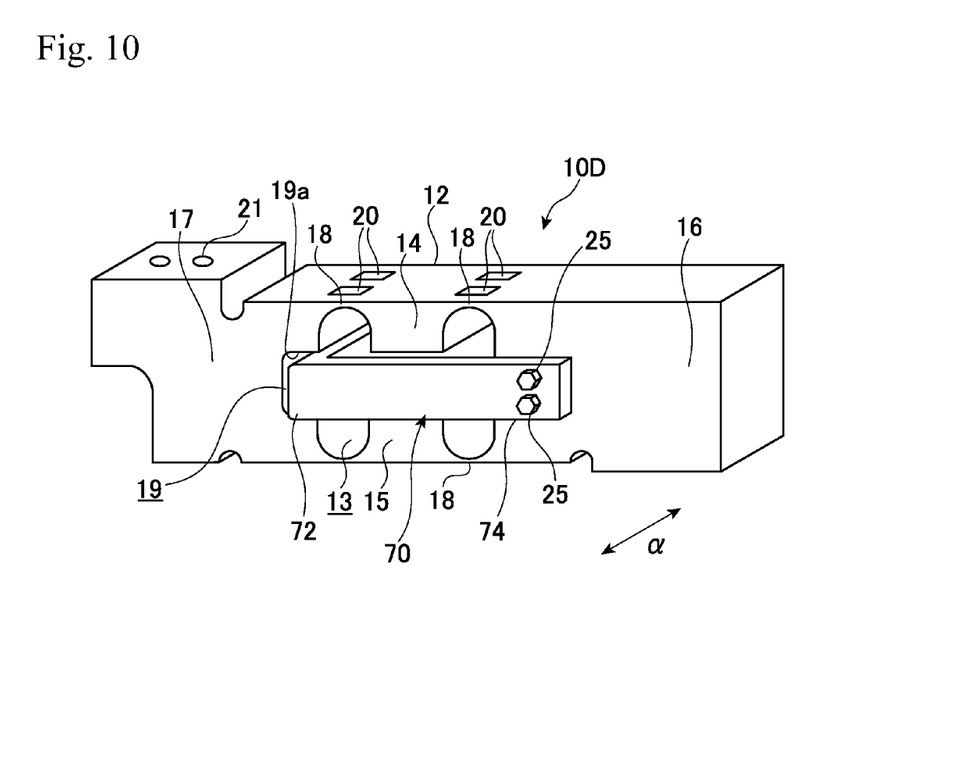
FIG. 10 An exploded perspective view of a load cell of a fifth embodiment.
Figure 11:
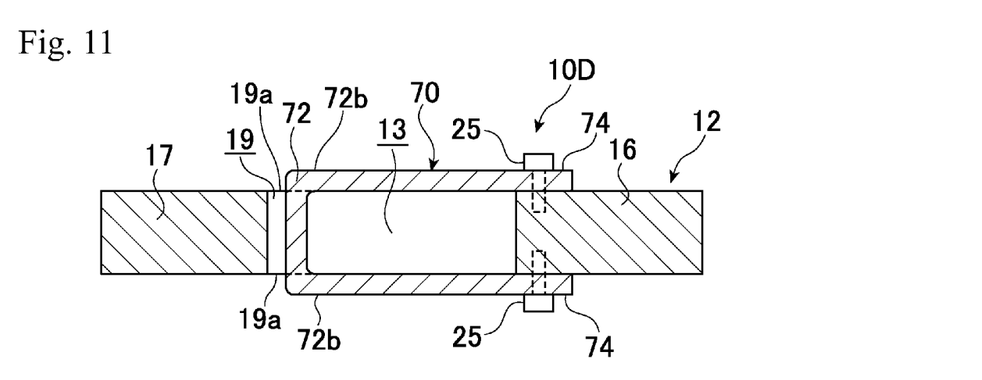
FIG. 11 A horizontal sectional view of the load cell of FIG. 10.

FIG. 10 shows an exploded perspective view of a load cell 10D of a fifth embodiment, and FIG. 11 shows a horizontal sectional view of the load cell 10D near the center thereof (the section at the same position as that of FIG. 3). The description of the components having similar configurations and performances of the preceding embodiments will be omitted by attaching the same symbols thereto.

A stopper 70 of the fifth embodiment is angular C-shaped (nearly U-shaped) in its horizontal section for example, by bending a metal plate having a specified thickness. A central portion between the bended portions is utilized as a front portion 72, and both ends are utilized as base portions 74. The width of the front portion 72 is larger than that of the movable portion 17. On the other hand, the base portions 74, are disposed while they sandwich the fixed portion 16 of the flexural element 12, and are fixed to the both side surfaces of the fixed portion 16 by means of the screws 25.

In the fifth embodiment having the above configuration, the front portion 72 of the stopper 70 is formed larger than the width of the moving portion 17 such that the front portion 72 of the stopper 70 projects toward the outside of the movable portion 17 as shown by a symbol 72b of FIG. 11.

The planar region of the front portion 72 of the stopper 70 extends along the upper and lower opposing positions of the edge portion 19a. Accordingly, when an overload in a torsion direction is exerted on the flexural element 12, the edge portion 19a is in contact with (the planar region of) the front portion 72 of the stopper 70 without fail so that an excessive overload above a specified value is not delivered to the flexural element 12 so as to suppress the excessive deformation of the thin portions 18.

The manufacturing cost can be reduced because the stopper 70 can be simply manufactured by only bending the metal plate.

The stopper 70 may be manufactured, after the extrusion molding of a metal material into an angular C-shaped section, by cutting the molding by a specified width. Also in the stopper having such a structure, the manufacturing cost can be reduced because of the simple manufacturing.

Figure 12:
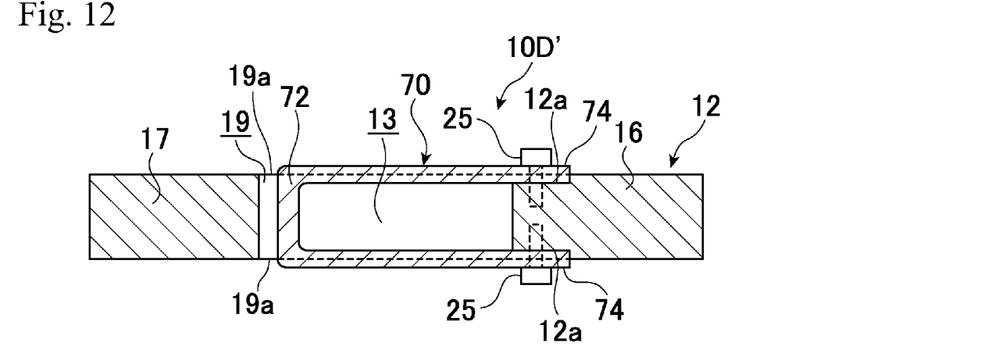
FIG. 12 A horizontal sectional view showing an alternative example of the load cell of the fifth embodiment.

In the load cell 10D' which is an alternative embodiment of the fifth embodiment, shown in FIG. 12, a stopper 70' is used of which a width is narrower than that of the stopper 70. The side surface of the fixed portion 16 of the flexural element 12 is subjected to a counterbore processing, and the base portion 74 of the stopper 70' may be mounted to this conterbored part 12a. Also in this instance, a similar effect to that of the load cell 10D can be obtained by forming the front portion 72 of the stopper 70' larger than the width of the movable portion 17.

Figure 13:
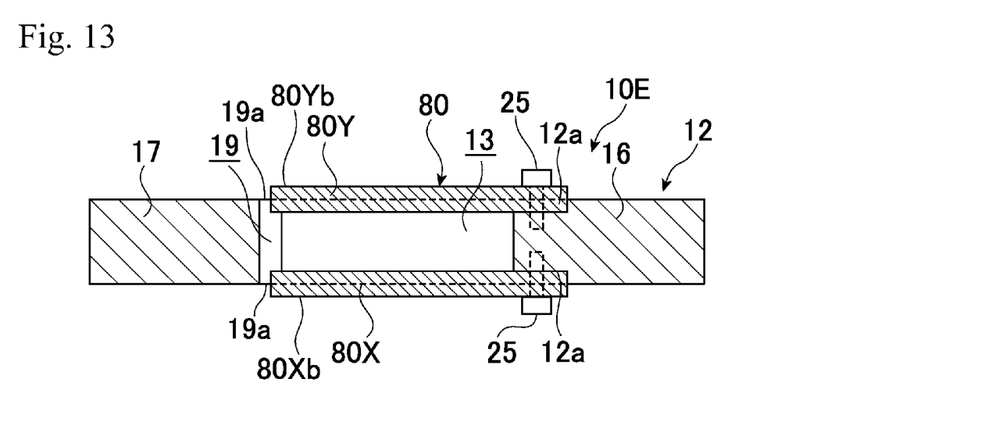
FIG. 13 A horizontal sectional view of a load cell of a sixth embodiment.

All which is needed is the formation of the planar region of the stopper 70 for preventing the overload along the upper and lower opposing positions of the edge portion 19a of the concave portion 19 for engaging the stopper formed on the inner side surface of the movable portion 17, and a load cell 10E of a sixth embodiment shown in FIG. 13 can be used.

A stopper 80 of the sixth embodiment is composed of two plate-shaped stoppers 80X, 80Y, and each of the plate-shaped stoppers 80X, 80Y is fixed to the right and left side surfaces of the fixed portion 16 of the flexural element 12 by means of the screws 25. The fixation position is subjected to the counterbore processing, and the plate-shaped stoppers 80X, 80Y have a thickness larger than the depth of the counterbored part 12a.

Accordingly, when the respective stoppers 80X, 80Y are fixed to the fixed portion 16, the front portions of the respective plate-shaped stoppers 80X, 80Y project toward the outside from the both side surfaces of the movable portion 17 as shown by symbols 80Xb, 80Yb, and the planar regions of the plate-shaped stoppers 80X, 80Y extend along the opposing positions of the edge portion 19a. Also in the stopper 80 having such a configuration, the overload in the torsion direction is prevented without fail. That is, the excessive overload above a specified value is not delivered to the flexural element 12 so as to suppress the excessive deformation of the thin portions 18.

DESCRIPTION OF SYMBOLS

10, 10A, 10B, 10C, 10D, 10D', 10E load cell
12 flexural element
13 penetration aperture
14 top beam
15 bottom beam
16 fixed portion
17 movable portion
18 thin portion
19 concave portion
19a edge portion of concave portion
20 strain gauge
30 stopper
32 front portion of stopper
32b projecting portion from the side surface of movable portion of front portion of stopper
34 base portion of stopper
36 side plate portion

The invention claimed is:

1. A load cell comprising:
a flexure element having a Roberval mechanism in which respective ends of a pair of top and bottom parallel beams including a thin section are integrated in a fixed portion and in a movable portion;
a stopper for preventing an overload disposed between the pair of the top and bottom parallel beams by being fixed to the fixed portion; and
a concave portion for engaging with the stopper extending in a width direction of the flexure element (the movable portion), which is mounted on an inner side surface of the movable portion (facing to the fixed portion),
wherein a base portion of the stopper is fixed to the fixed portion, and a front portion of the stopper is disposed in the concave portion keeping a specified clearance; and
the front portion of the stopper is formed broader than the movable portion of the flexure element so that the front portion projects toward outside of the width direction of the movable portion, and
wherein the base portion of the stopper includes at least one side plate portion having one end integrally formed with a side edge of the front portion of the stopper such that the amount to which the breadth of the stopper extends beyond a breadth of the movable portion of the flexure element on one side is defined by a breadth of the side plate portion.

2. The load cell as claimed in claim 1,
wherein the at least one side plate portion is in surface-contact with at least one of right and left outer side surfaces of the fixed portion, and the side plate portion has a larger length along a vertical direction than a thickness of the front portion, and the side plate portion is fixed to the at least one of right and left outer side surfaces of the fixed portion.

3. The load cell as claimed in claim 2,
wherein the at least one side plate portion comprises a pair of the side plate portions mounted on both side edges of the front portion of the stopper in the breadth direction, and the pair of the side plate portions are fixed to right and left outer side surfaces of the fixed portion.

4. The load cell as claimed in claim 1,
wherein the base portion of the stopper includes an end plate portion in surface-contact with a fixed-portion-side end surface of the flexure element, and the end plate portion is fixed to the fixed-portion-side end surface of the flexure element.

5. The load cell as claimed in claim 1, wherein the stopper is divided into two in the width direction of the flexure element, and each of the two separate stoppers is fixed to the fixed portion of the flexure element.

6. The load cell as claimed in claim 1, wherein the stopper includes a constant height in a vertical direction and is angular C-shaped (nearly U-shaped) in its horizontal section, and a pair of angular C-shaped crossbars are fixed to right and left outer side surfaces of the fixed portion of the flexural element.

* * * * *